(12) United States Patent
Schoenek et al.

(10) Patent No.: US 8,900,094 B2
(45) Date of Patent: Dec. 2, 2014

(54) ENGINE DAMPER BYPASS FOR HYBRID POWERTRAINS

(71) Applicant: GM Global Technology Operations LLC, Detroit, MI (US)

(72) Inventors: Norman Schoenek, Novi, MI (US); Min-Joong Kim, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 102 days.

(21) Appl. No.: 13/669,503

(22) Filed: Nov. 6, 2012

(65) Prior Publication Data

US 2014/0128215 A1 May 8, 2014

(51) Int. Cl.
*B60W 20/00* (2006.01)
*F16D 23/00* (2006.01)

(52) U.S. Cl.
USPC ............................................. 477/5; 192/55.3

(58) Field of Classification Search
USPC .............. 477/5; 475/5; 192/48.92, 3.27, 3.31, 192/43.1, 55.3, 41 R–41 A
See application file for complete search history.

(56) References Cited

U.S. PATENT DOCUMENTS

| | | | |
|---|---|---|---|
| 5,482,512 A | 1/1996 | Stevenson | |
| 5,789,823 A * | 8/1998 | Sherman | 290/47 |
| 5,927,455 A * | 7/1999 | Baker et al. | 192/36 |
| 5,931,271 A | 8/1999 | Haka | |
| 6,979,275 B2 * | 12/2005 | Hiraku et al. | 475/214 |
| 7,052,430 B2 | 5/2006 | Stevenson et al. | |
| 7,401,687 B2 | 7/2008 | Schultz | |
| 7,452,305 B2 * | 11/2008 | Oliver et al. | 475/331 |
| 7,484,605 B2 * | 2/2009 | Pawley et al. | 192/43.1 |
| 7,942,781 B2 * | 5/2011 | Kimes | 477/5 |
| 8,113,089 B2 | 2/2012 | Maguire | |
| 8,167,771 B2 * | 5/2012 | Roses et al. | 477/5 |
| 8,376,905 B2 * | 2/2013 | Kasuya et al. | 477/5 |
| 2008/0000746 A1 * | 1/2008 | Schiele et al. | 192/3.54 |
| 2010/0087290 A1 | 4/2010 | Schoenek et al. | |
| 2012/0149518 A1 * | 6/2012 | Kimes | 475/5 |
| 2013/0296108 A1 * | 11/2013 | Ortmann et al. | 477/5 |
| 2014/0080648 A1 * | 3/2014 | Kimes | 475/5 |

FOREIGN PATENT DOCUMENTS

GB 717868 A * 11/1954

* cited by examiner

Primary Examiner — Roger Pang
(74) Attorney, Agent, or Firm — Quingg Law Group, PLLC

(57) ABSTRACT

A powertrain includes an engine having a crankshaft, a transmission having an input member, and a damper operatively interconnecting the input member and the crankshaft to transmit torque from the crankshaft to the input member. An electric motor/generator is operatively connected to the transmission input member to selectively transmit torque thereto. A damper bypass system is operatively connected to the crankshaft and the input member. The damper bypass system is configured not to transfer torque from the crankshaft to the input member, but transmits torque from the input member to the crankshaft in response to input member torque exceeding crankshaft torque.

12 Claims, 3 Drawing Sheets

ENGINE DAMPER BYPASS FOR HYBRID POWERTRAINS

TECHNICAL FIELD

This invention relates to hybrid powertrains having engine dampers.

BACKGROUND

A hybrid powertrain typically includes an engine and one or more motor/generators that cooperate to efficiently supply power to propel a vehicle. Some vehicles with hybrid powertrains are able to turn off the engine and rely on torque supplied solely from at least one of the motor/generators in certain operating modes to improve fuel economy; when operating conditions require positive engine torque, the engine is restarted using torque from one of the motor/generators in what is referred to as an "autostart." In some hybrid powertrains, the motor/generators are part of the transmission, and torque from the motor/generators to restart the engine is transmitted to the engine crankshaft via the input shaft of the transmission.

A damper is often used in the connection between the engine and the transmission input shaft to reduce vibration and filter out high-frequency engine torque oscillations while transferring engine torque. The damper is desirable when torque is being transmitted from the engine to the transmission, but the damper is not desirable when torque is being transmitted from the transmission or the motor/generator to the engine during an autostart.

Some hybrid powertrains utilize a damper bypass clutch (DBC), which is engaged during an engine autostart in order to bypass the damper. When engaged, the DBC provides a separate, undamped connection between input shaft and the crankshaft. The DBC is released during normal operation, restoring the damper function. The DBC is typically hydraulically actuated, and controlled by a powertrain controller. The powertrain controller engages the DBC in anticipation of an autostart event.

SUMMARY

A powertrain includes an engine having a crankshaft, a transmission having an input member, and a damper operatively interconnecting the input member and the crankshaft to transmit torque from the crankshaft to the input member while isolating the transmission from engine torque oscillations. An electric motor/generator is operatively connected to the transmission input member to selectively transmit torque thereto.

A damper bypass system is operatively connected to the crankshaft and the input member. The damper bypass system is configured not to transfer torque from the crankshaft to the input member so that all torque from the engine goes through the damper to isolate the transmission and the motor/generator from engine torque oscillations. The damper bypass system is configured to transmit torque from the input member to the crankshaft in response to input member torque exceeding crankshaft torque, thereby providing direct (i.e., undamped) torque transmittal from the motor/generator to the engine during an autostart.

The damper bypass system improves upon the prior art because the transmission of torque through the damper bypass occurs automatically in response to input member torque exceeding a predetermined threshold amount, instead of requiring the active step of engaging a damper bypass clutch in anticipation of an autostart. Also, the damper bypass system provided herein does not require the use of high-pressure hydraulics, unlike prior art damper bypass clutches, and therefore the damper bypass system provided herein reduces complexity and improves efficiency compared to the prior art.

The above features and advantages and other features and advantages of the present invention are readily apparent from the following detailed description of the best modes for carrying out the invention when taken in connection with the accompanying drawings.

DETAILED DESCRIPTION

Figure 1:
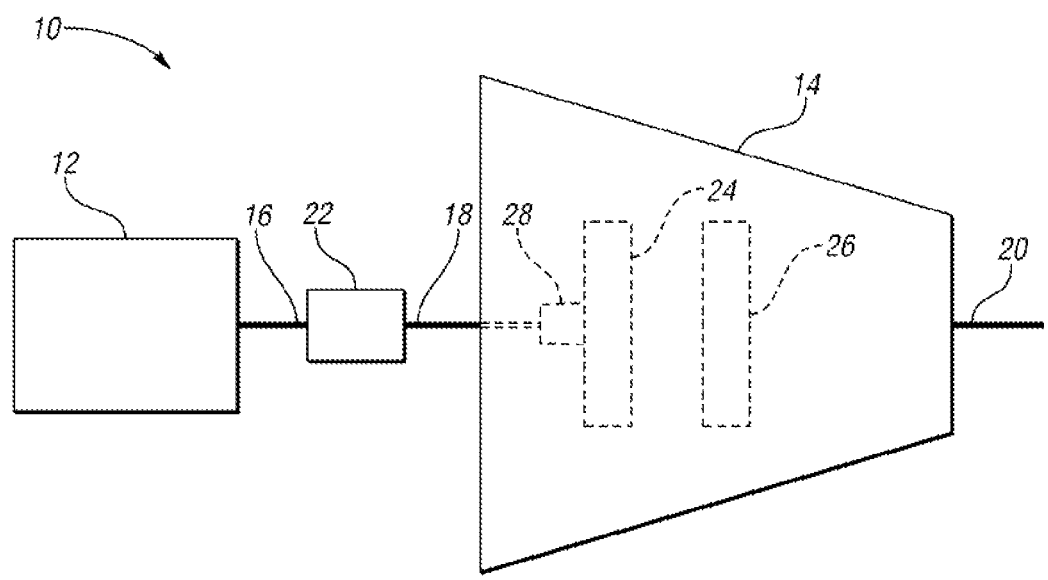
FIG. 1 is a schematic, side view of a powertrain having an engine and a transmission.

Referring to FIG. 1, a hybrid powertrain 10 is schematically depicted. The powertrain 10 includes an engine 12 and a transmission 14. The engine 12 includes an output member, which, in the embodiment depicted, is a crankshaft 16. The transmission 14 in the embodiment depicted is an electrically variable transmission, and includes an input member 18, an output member 20, and gearing (not shown) that operatively interconnects the input member 18 and the output member 20. The powertrain 10 includes a connection apparatus 22 that connects the crankshaft 16 of the engine 12 to the input member 18 of the transmission 14 such that torque is transmissible therebetween. The electrically variable transmission 14 includes a first motor/generator 24 and a second motor/generator 26.

The speed ratio between the input member 18 and the output member 20 is proportional to the speed of one or both of the motor/generators 24, 26, and therefore the speed ratio is continuously variable by varying the speed of one or both of the motor/generators 24, 26. Each motor/generator 24, 26 is operatively connected to an electrical energy storage device, such as a battery (not shown), to receive electrical energy therefrom when operating as a motor, or to transmit electrical energy thereto when operating as a generator.

The transmission 14 results in the powertrain 10 being a hybrid-electric powertrain because the motor/generators 24, 26 can be operated to supplement the power and torque output of the engine 12 to the transmission output member 20 using electrical energy from battery, and the motor/generators 24, 26 can convert mechanical energy from the engine 12 to electrical energy, which is then stored as chemical energy in the battery for later use by the motor/generators 24, 26, as understood by those skilled in the art. Although the hybrid powertrain 10 in the embodiment depicted includes an electrically variable transmission 14, other hybrid powertrain configurations may be employed within the scope of the claimed invention.

The transmission 14 may operate in an electric vehicle (EV) mode in which all of the power and torque to the output member 20 is provided by one or both of the motor/generators 24, 26 powered by the battery. In the EV mode, the engine 12 is turned off, or shut down, to save fuel. When the EV mode ends and the engine 12 must be restarted, one of the motor/generators 24, 26 may be connected to the input member 18, such as via the engagement of a clutch (not shown), to transmit torque to the crankshaft 16 via the connection apparatus 22. Thus, the rotor 28 of motor/generator 24 is operatively connected to the input member 18, such as via a selectively engageable clutch and/or one or more planetary gearsets, to selectively transmit torque thereto.

Figure 2:
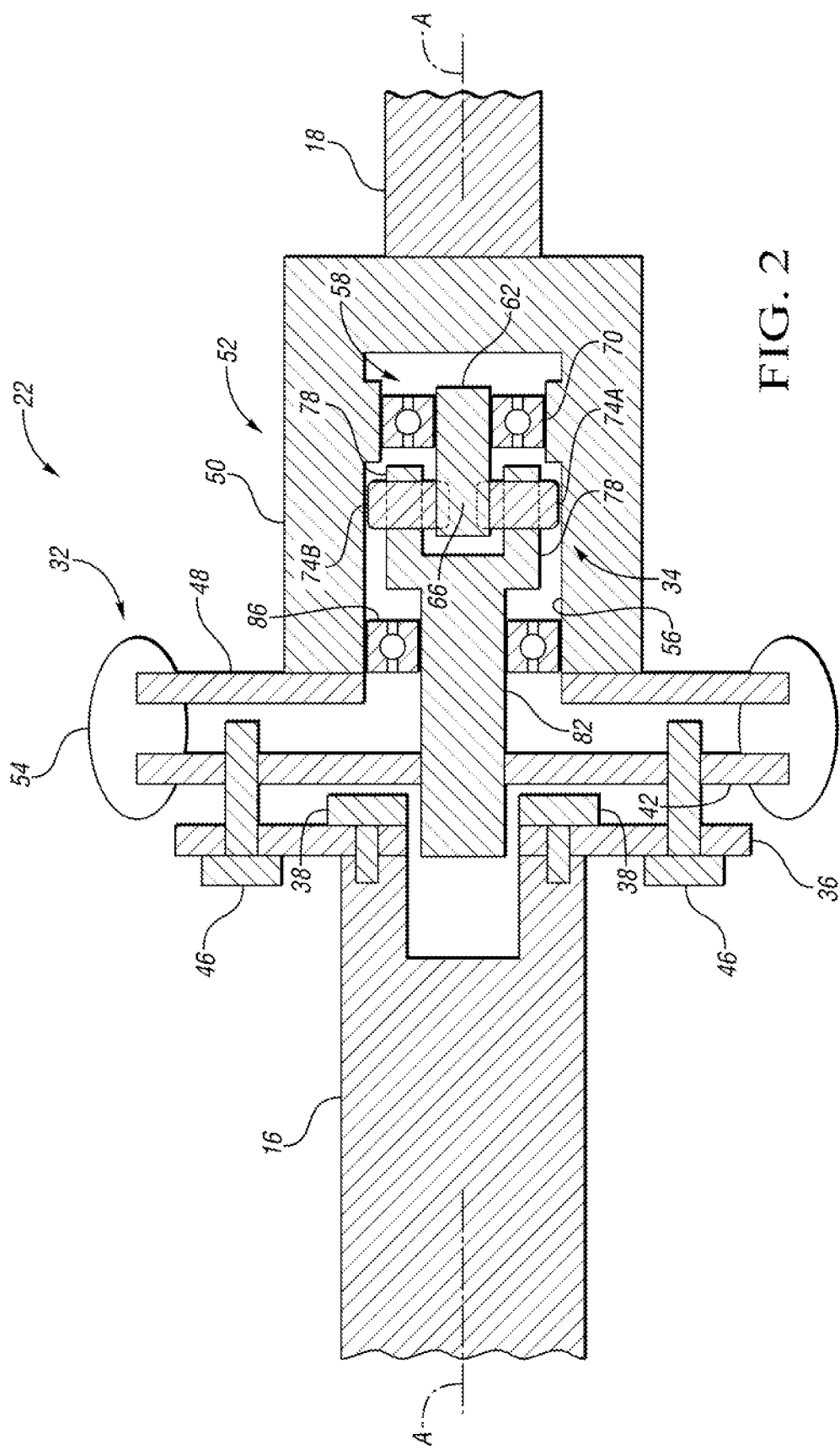
FIG. 2 is a schematic, cross-sectional side view of a damper and a damper bypass system that interconnect the engine and the transmission of FIG. 1.

Referring to FIG. 2, wherein like reference numbers refer to like components from FIG. 1, the connection apparatus 22 is schematically depicted. The connection apparatus 22 includes a damper 32 and a damper bypass system 34. The damper 32 operatively interconnects the crankshaft 16 and the transmission input member 18. More specifically, in the embodiment depicted, a flex plate 36 is mounted to the crankshaft 16 via threaded fasteners 38. In turn, the flex plate 36 is mounted to a first rotating member 42 via threaded fasteners 46. A second rotating member 48 is rigidly mounted to the input member 18 of the transmission 14 via the outer race 50 of a bidirectional one-way clutch 52. The damper 32 is between the two rotating members 42, 48 and includes a plurality of springs 54 that interconnect the two rotating members 42, 48.

Accordingly, as the crankshaft 16 rotates about axis A, torque from the crankshaft 16 is transmitted to the transmission input member 18 via the flex plate 36, member 42, springs 54, member 48, and outer race 50. Torque from the crankshaft 16 to the input member 18 is thus transmitted through the springs 54 of the damper 32.

The damper 32 thus isolates the transmission 14 from vibration and torque oscillations from the engine crankshaft 16. However, when torque is transmitted to the engine crankshaft 16 from the motor/generator 24 via the input member 18 during an autostart event, the damper 32 is not desirable. The damper bypass system 34 provides an undamped connection (i.e., torque transmission path) between the input member 18 and the crankshaft 16 for use during autostarts, when motor torque is used to restart the engine 12.

The damper bypass system 34 does not transmit torque from the crankshaft 16 to the input member 18, thereby ensuring that all torque from the engine to the transmission is transmitted through the damper 32. The damper bypass system 34 is configured to automatically lock the input member 18 with respect to the crankshaft 16 for unitary rotation in response to the input member torque exceeding the crankshaft torque, thereby providing an undamped torque path when an autostart occurs.

More specifically, the damper bypass system 34 includes the bidirectional one-way clutch 52. The outer race 50 of the one-way clutch 52 is mounted to the input member 18 for unitary rotation therewith. The outer race 50 has a cylindrical inner surface 56 that defines a cylindrical cavity 58. The clutch 52 includes an inner race 62 having a generally cylindrical outer surface 66. The inner race 62 is supported within the cavity 58 by a bearing 70 such that the inner race 62 is selectively rotatable with respect to the outer race 50. A first plurality of sprags 74A and a second plurality of sprags 74B are disposed between the outer surface 66 of race 62 and the inner surface 56 of race 50.

The one-way clutch 52 also includes a plurality of release tabs 78 that are operative connected to the crankshaft 16 for rotation therewith about axis A. More specifically, in the embodiment depicted, the tabs 78 are connected to a shaft 82, which in turn is connected to member 42. Since member 42 is connected to the crankshaft 16 for rotation therewith about axis A via the flex plate 36, the shaft 82 and the tabs 78 are also connected to the crankshaft 16 for rotation therewith about axis A.

Figure 3:
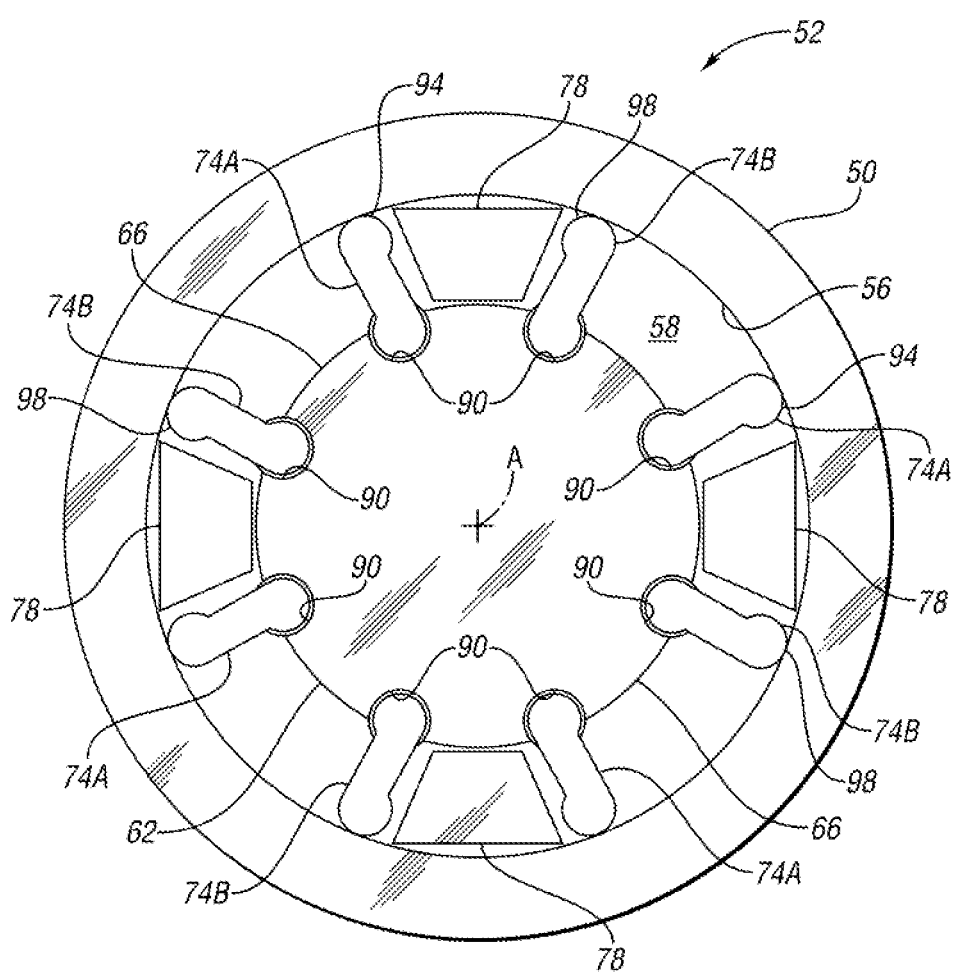
FIG. 3 is a schematic, front view of a one-way clutch that is part of the damper bypass system of FIG. 2.

Referring to FIG. 3, wherein like reference numbers refer to like components from FIGS. 1 and 3, the first plurality of sprags 74A are configured such that rotation of the outer race 50 in a first direction about axis A causes the first plurality of sprags 74A to be cammed or wedged between the inner race 62 and the outer race 50 thereby to transmit torque from the outer race 50 to the inner race 62. That is, the sprags 74A are pivotable with respect to the races 50, 62. Inner race 62 defines a plurality of concavities 90 in outer surface 66, and each of the sprags 74A is partially disposed, and pivotable within, a respective one of the concavities 90. Each sprag 74A includes a surface 94 adjacent the inner surface 56 of the outer race 50 that is shaped to wedge against the inner surface 56 when the outer race 50 rotates in the first direction, and therefore the sprags 74A transmit torque in the first direction to the inner race 62 and the release tabs 78. Since the release tabs 78 are mounted to the crankshaft 16, the torque from the outer race 50 (and the input member 18 attached thereto) is transmitted to the crankshaft 16.

Similarly, the second plurality of sprags 74B are configured such that rotation of the outer race 50 in a second direction about axis A causes the second plurality of sprags 74B to be cammed or wedged between the inner race 62 and the outer race 50 thereby to transmit torque from the outer race 50 to the inner race 62. That is, the sprags 74B are pivotable with respect to the races 50, 62. Inner race 62 defines a plurality of concavities 90 in outer surface 66, and each of the sprags 74B is partially disposed, and pivotable within, a respective one of the concavities 90. Each sprag 74B includes a surface 98 adjacent the inner surface 56 of the outer race 50 that is shaped to wedge against the inner surface 56 when the outer race 50 rotates in the second direction, and therefore the sprags 74B transmit torque in the second direction to the inner race 62 and the release tabs 78. Since the release tabs 78 are mounted to the crankshaft 16, the torque from the outer race 50 (and the input member 18 attached thereto) is transmitted to the crankshaft 16.

The release tabs 78 are configured to prevent the sprags 74A, 74B from wedging between the inner race 62 and the outer race 50 when the torque on the release tabs 78 exceeds the torque on the outer race 50. In other words, the sprags 74A, 74B are released by the tabs 78 in either direction when engine torque is greater than input member torque, and therefore the torque from the engine is not transmitted through the one-way clutch 52 to the input member 18.

While the best modes for carrying out the invention have been described in detail, those familiar with the art to which this invention relates will recognize various alternative designs and embodiments for practicing the invention within the scope of the appended claims.

The invention claimed is:

1. A powertrain comprising:
an engine having a crankshaft;
a transmission having an input member;
an electric motor/generator operatively connected to the transmission input member and configured to selectively transmit torque thereto;
a damper operatively interconnecting the input member and the crankshaft;
a damper bypass system operatively connected to the crankshaft and the input member;
wherein the damper bypass system is configured to never transfer torque from the crankshaft to the input member; and wherein the damper bypass system is configured to transmit torque from the input member to the crankshaft in response to input member torque exceeding crankshaft torque.

2. The powertrain of claim 1, wherein the damper bypass system includes a one-way clutch that operatively interconnects the crankshaft and the input member.

3. The powertrain of claim 2, wherein the one-way clutch includes an outer race mounted with respect to one of the crankshaft and the input member for rotation therewith, an inner race, and a plurality of sprags between the inner race and the outer race.

4. The powertrain of claim 3, wherein the sprags are configured such that rotation of the outer race causes the sprags to be wedged between the inner race and the outer race thereby to transmit torque from the outer race to the inner race.

5. The powertrain of claim 4, further comprising a plurality of release tabs that are operatively connected to one of the crankshaft and the input member for rotation therewith;
wherein each of the release tabs extends between two of the sprags.

6. The powertrain of claim 5, wherein the release tabs are configured to prevent the sprags from wedging between the inner race and the outer race when the torque on the release tabs exceeds the torque on the outer race.

7. The powertrain of claim 2, wherein the electric motor/generator is part of the transmission.

8. A powertrain comprising:
an engine having a crankshaft;
a transmission having an input member;
an electric motor/generator operatively connected to the input member and configured to selectively transmit torque thereto;
a damper operatively interconnecting the input member and the crankshaft;
a damper bypass system including a bidirectional one-way clutch and operatively connected to the crankshaft and the input member;

wherein the bidirectional one-way clutch is configured to never transfer torque from the crankshaft to the input member; and
wherein the bidirectional one-way clutch is configured to transmit torque from the input member to the crankshaft in response to input member torque exceeding crankshaft torque.

9. The powertrain of claim 8, wherein the bidirectional one-way clutch includes an outer race mounted with respect to one of the crankshaft and the input member for rotation therewith, an inner race, a first plurality of sprags between the inner race and the outer race, and a second plurality of sprags between the inner race and the outer race.

10. The powertrain of claim 9, wherein the first plurality of sprags are configured such that rotation of the outer race in a first direction causes the first plurality of sprags to be wedged between the inner race and the outer race thereby to transmit torque from the outer race to the inner race; and
wherein the second plurality of sprags are configured such that rotation of the outer race in a second direction opposite the first direction causes the second plurality of sprags to be wedged between the inner race and the outer race thereby to transmit torque from the outer race to the inner race.

11. The powertrain of claim 10, further comprising a plurality of release tabs that are operatively connected to one of the crankshaft and the input member for rotation therewith;
wherein each of the release tabs extends between one of the sprags in the first plurality of sprags and one of the sprags in the second plurality of sprags.

12. The powertrain of claim 11, wherein the release tabs are configured to prevent the sprags from wedging between the inner race and the outer race when the torque on the release tabs exceeds the torque on the outer race.

* * * * *